(12) United States Patent
Hesse et al.

(10) Patent No.: US 12,275,160 B2
(45) Date of Patent: Apr. 15, 2025

(54) MANUALLY OPERATED CUTTING DEVICE HAVING A RATCHET MECHANISM

(71) Applicant: ROTHENBERGER AG, Kelkheim (DE)

(72) Inventors: Dennis Hesse, Frankfurt (DE); Maximilian Gottschalk, Wiesbaden (DE); Jonas Schilling, Frankfurt (DE)

(73) Assignee: ROTHENBERGER AG, Kelkheim (DE)

( * ) Notice: Subject to any disclaimer, the term of this patent is extended or adjusted under 35 U.S.C. 154(b) by 555 days.

(21) Appl. No.: 17/609,758

(22) PCT Filed: Apr. 30, 2020

(86) PCT No.: PCT/DE2020/100361
§ 371 (c)(1),
(2) Date: Nov. 8, 2021

(87) PCT Pub. No.: WO2020/228896
PCT Pub. Date: Nov. 19, 2020

(65) Prior Publication Data
US 2022/0219342 A1 Jul. 14, 2022

(30) Foreign Application Priority Data

May 10, 2019 (DE) ...................... 10 2019 112 315.1
May 10, 2019 (DE) ...................... 10 2019 112 326.7

(51) Int. Cl.
*B26D 3/16* (2006.01)
*A01G 3/02* (2006.01)
(Continued)

(52) U.S. Cl.
CPC ............. *B26D 3/169* (2013.01); *A01G 3/021* (2013.01); *A01G 3/0251* (2013.01); *B26B 13/26* (2013.01); *B26B 13/28* (2013.01)

(58) Field of Classification Search
CPC ....... B26B 13/26; B26B 13/28; B26B 13/285; B26D 3/169; A01G 3/02; A01G 3/021; A01G 3/0251
See application file for complete search history.

(56) References Cited

U.S. PATENT DOCUMENTS

| 127,735 | A | * | 6/1872 | Broadbooks | ............. | A01G 3/02 30/250 |
| 134,185 | A | * | 12/1872 | Yancey | .................... | A01G 3/02 30/227 |

(Continued)

FOREIGN PATENT DOCUMENTS

| DE | 4012607 A1 | 10/1991 |
| DE | 102007031145 A1 | 1/2009 |

(Continued)

OTHER PUBLICATIONS

Rothenberger Werkzeuge GmbH, Kelkheim, Germany, 2012/2013 product catalog entitled "Rothenberger—pipetool technologies at work".

*Primary Examiner* — Jason Daniel Prone
(74) *Attorney, Agent, or Firm* — Smartpat PLC (57) ABSTRACT

A cutting device for the chipless cutting of a material comprises a cutting part and a supporting part. The cutting part and the supporting part are designed to be rotated with respect to one another about an axis of rotation between an open position and a closed position. A hand lever is articulated to the supporting part for pivoting about a pivot axis. A ratchet mechanism converts a back-and-forth motion of the hand lever into a continuous rotational motion of the cutting part toward the closed position. The ratchet mechanism includes a toothing and a drive pawl, which can be brought into an effective position with respect to the toothing. Furthermore, the cutting device comprises a coupling mechanism, which converts a one-time pivoting motion of (Continued)

the hand lever into a rotational motion of the cutting part. A separate coupling element transmits force from the hand lever to the cutting part.

3 Claims, 6 Drawing Sheets

(51) Int. Cl.
    *A01G 3/025*     (2006.01)
    *B26B 13/26*     (2006.01)
    *B26B 13/28*     (2006.01)

(56) References Cited

U.S. PATENT DOCUMENTS

| | | | | |
|---|---|---|---|---|
| 356,278 | A * | 1/1887 | Dufrane | A01G 3/02 30/239 |
| 448,363 | A * | 3/1891 | Perry et al. | A01G 3/02 30/239 |
| 474,085 | A * | 5/1892 | Gilman | A01G 3/02 30/239 |
| 485,793 | A * | 11/1892 | Hatch | A01G 3/02 30/239 |
| 500,526 | A * | 6/1893 | Behmer | A01G 3/02 30/239 |
| 812,528 | A * | 2/1906 | Rohrer | A01G 3/02 30/239 |
| 953,365 | A * | 3/1910 | Wheeler | A01G 3/02 30/239 |
| 1,636,088 | A * | 7/1927 | Bernard | A01G 3/02 30/262 |
| 2,208,903 | A * | 7/1940 | Joost | A01G 3/0251 30/271 |
| 2,520,905 | A * | 9/1950 | Borrelli | A01G 3/02 30/237 |
| 2,807,087 | A * | 9/1957 | Smith | A01G 3/02 30/186 |
| 3,243,880 | A * | 4/1966 | Weller | A01G 3/02 30/189 |
| 3,273,240 | A * | 9/1966 | Florian | A01G 3/0251 30/192 |
| 3,390,455 | A * | 7/1968 | Florian | A01G 3/0251 30/251 |
| 4,176,450 | A * | 12/1979 | Muromoto | B26D 3/169 30/92 |
| 4,368,577 | A * | 1/1983 | Babb | B26B 13/26 30/92 |
| 4,674,184 | A * | 6/1987 | Anderson | B26D 3/169 30/92 |
| 5,129,158 | A * | 7/1992 | Campagna | B26D 3/169 30/92 |
| 5,218,768 | A * | 6/1993 | Putsch | B26B 13/26 30/253 |
| 5,511,314 | A * | 4/1996 | Huang | A01G 3/0251 30/249 |
| 5,526,570 | A * | 6/1996 | Beetz | B26B 13/26 30/253 |
| 5,709,030 | A * | 1/1998 | Wang | A01G 3/0251 30/249 |
| 5,718,051 | A * | 2/1998 | Huang | B26D 3/169 30/92 |
| 5,761,815 | A * | 6/1998 | Lin | A01G 3/0251 30/140 |
| 5,774,991 | A * | 7/1998 | Shi | A01G 3/021 30/262 |
| 5,787,589 | A * | 8/1998 | Auderset | A01G 3/02 30/271 |
| 6,098,291 | A * | 8/2000 | Wang | B26D 3/169 30/190 |
| 6,305,087 | B1 * | 10/2001 | Huang | B26D 3/169 30/250 |
| 6,640,441 | B1 * | 11/2003 | Huang | B26D 3/169 30/233 |
| 6,640,442 | B2 * | 11/2003 | Lin | A01G 3/0251 30/249 |
| 6,935,031 | B1 * | 8/2005 | Huang | B26B 13/26 30/249 |
| 7,127,819 | B1 * | 10/2006 | Huang | B26D 3/169 30/92 |
| 7,178,245 | B1 * | 2/2007 | Lee | A01G 3/02 30/261 |
| 7,454,837 | B2 * | 11/2008 | Shan | A01G 3/02 30/254 |
| 8,166,659 | B2 * | 5/2012 | Huang | B26B 13/26 30/190 |
| 8,220,164 | B2 * | 7/2012 | Linden | A01G 3/0251 30/340 |
| 8,225,513 | B2 * | 7/2012 | Huang | A01G 3/0251 30/190 |
| 8,458,912 | B2 * | 6/2013 | Linden | A01G 3/02 30/131 |
| 8,549,757 | B2 * | 10/2013 | Wu | A01G 3/02 30/244 |
| 8,578,614 | B2 * | 11/2013 | Hernandez | B26D 3/169 30/192 |
| 8,732,960 | B2 * | 5/2014 | Wang | A01G 3/021 30/244 |
| 9,066,473 | B2 * | 6/2015 | Podlesny | A01G 3/021 |
| 9,282,697 | B2 * | 3/2016 | Wu | A01G 3/02 |
| 9,345,200 | B2 * | 5/2016 | Cunningham | A01G 3/0251 |
| 9,554,522 | B2 * | 1/2017 | Reh | A01G 3/0251 |
| 9,565,806 | B2 * | 2/2017 | Maag | A01G 3/02 |
| 9,572,301 | B2 * | 2/2017 | Chou | B26B 13/26 |
| 9,591,808 | B2 * | 3/2017 | Lin | A01G 3/0251 |
| 9,596,810 | B2 * | 3/2017 | Wu | A01G 3/021 |
| 9,622,422 | B2 * | 4/2017 | Hsu | B26B 13/26 |
| 9,736,990 | B2 * | 8/2017 | Lin | A01G 3/0251 |
| 9,769,989 | B2 * | 9/2017 | Cordoba Sanchez | B26B 13/26 |
| 10,232,452 | B2 * | 3/2019 | Chen | B26D 3/169 |
| 10,307,918 | B2 * | 6/2019 | Chen | B26B 13/26 |
| 11,045,962 | B2 * | 6/2021 | Li | B26D 3/16 |
| 11,565,433 | B2 * | 1/2023 | Ma | B26B 13/28 |
| 2007/0079512 | A1 * | 4/2007 | Nelson | A01G 3/0251 30/123.3 |
| 2010/0139100 | A1 | 6/2010 | Mortensen | |
| 2012/0047750 | A1 | 3/2012 | Maag et al. | |
| 2013/0042486 | A1 * | 2/2013 | Lee | A01G 3/02 30/249 |
| 2017/0215346 | A1 | 8/2017 | Lin | |
| 2017/0245439 | A1 * | 8/2017 | Nelson | A01G 3/02 |
| 2020/0016670 | A1 * | 1/2020 | Wang | B26D 3/169 |
| 2022/0193941 | A1 * | 6/2022 | Wilson | B26B 13/28 |
| 2022/0304242 | A1 * | 9/2022 | Heine | A01G 3/0251 |
| 2022/0324124 | A1 * | 10/2022 | Li | B26D 3/16 |
| 2023/0189716 | A1 * | 6/2023 | Wu | A01G 3/021 30/194 |
| 2025/0010500 | A1 * | 1/2025 | Li | B26B 13/26 |

FOREIGN PATENT DOCUMENTS

| | | | | |
|---|---|---|---|---|
| DE | 102009019989 A1 | | 11/2010 | |
| DE | 102019112315 A1 | * | 11/2020 | B26B 13/26 |

* cited by examiner

MANUALLY OPERATED CUTTING DEVICE HAVING A RATCHET MECHANISM

TECHNICAL FIELD

The disclosure relates to a cutting device for the chipless cutting of material to be cut. The disclosure further relates to a method for chipless cutting of material to be cut.

BACKGROUND

A manually operated cutting device for the chipless cutting of a material to be cut is known from the 2012/2013 product catalog entitled "Rothenberger-pipetool technologies at work" of Rothenberger Werkzeuge GmbH, Kelkheim, Germany, pages 20 and 21. The cutting device is used there for cutting to length plastic pipes or multilayer composite pipes, which are installed in the heating and/or sanitary sector, for example. The cutting device is designed to provide a relatively high cutting force. For this purpose, the cutting device has a ratchet function, which divides a feed motion of the cutter into multiple operating motions of the hand lever of the cutting device.

SUMMARY

One object of the disclosure is to propose at least one option for optimizing the previous concept for the chipless cutting of material to be cut.

The object is achieved with a cutting device and a method as claimed. Advantageous embodiments and/or configurations and/or aspects of the invention are apparent from the claims, the following description and the figures.

A basic cutting device for the chipless cutting of material to be cut comprises a cutting part having a cutter and a supporting part that can be used as a support for the material to be cut. The cutting part and the supporting part are mounted for rotation with respect to one another about an axis of rotation and are designed to be rotated with respect to one another about the axis of rotation between an open position and a closed position. In particular, the cutting part is to be moved relative to the supporting part between the open position and the closed position. For example, the supporting part has a support section or a rest section, as the case may be, for the material to be cut. The support section can be a component of a counterholder or anvil. Moreover, the support section can have or form its own cutter.

In the present description, the term "open position" refers in particular to such an open position of the cutting part relative to the supporting part that the material to be cut can be received therebetween, in order to cut it in the course of a cutting operation, that is, by moving the cutting part or its cutter, as the case may be, in the direction of the supporting part. In the present description, the term "closed position" refers in particular to a position that the cutting part assumes with respect to the supporting part if the cutting operation has been carried out and, for example, the material to be cut has been severed.

In the closed position, the cutter of the cutting part can be moved up to the supporting part or its rest surface, as the case may be, for the material to be cut or beyond the supporting part or its rest surface, as the case may be, such that there is no distance between the cutter and the supporting part as seen in the direction of the axis of rotation. Moreover, in the closed position, viewed in the direction of the axis of rotation, there may still be a gap, in particular a small gap, between the cutting part or the cutter, as the case may be, and the supporting part or its rest surface, as the case may be.

In particular, the cutting device also comprises a hand lever leg and a ratchet mechanism. The hand lever leg is articulated to the supporting part for pivoting about a pivot axis. The ratchet mechanism is designed to convert a back-and-forth motion of the hand lever leg about the pivot axis into a continuous rotational motion of the cutting part toward the closed position. The ratchet mechanism has toothing and a drive pawl. The drive pawl can be brought into an effective position with respect to the toothing, in order to bring about a transmission of force from the hand lever leg to the cutting part. The drive pawl can be mounted for rotation on the hand lever leg, in particular directly or via an intermediate element on the hand lever leg. The ratchet mechanism favors cutting such material to be cut by hand force, which requires a relatively large cutting force to be cut.

With one embodiment, the cutting device also comprises a coupling mechanism, which is designed to convert a one-time pivoting motion of the hand lever leg about the pivot axis into a rotational motion of the cutting part from the open position into the closed position. The coupling mechanism enables the direct cutting of the material to be cut, that is, the material to be cut, in particular severed, with a one-time operation of the hand lever leg. Due to the fact that the hand lever leg only has to be operated once, a relatively rapid cutting of the material to be cut, in particular severing the material to be cut, is favored.

With an additional embodiment, the coupling mechanism has a preferably separate coupling element, in order to bring about a transmission of force from the hand lever leg to the cutting part. This makes it possible to implement the coupling mechanism without resorting to components of the ratchet mechanism, such as the drive pawl and/or the toothing, for this purpose. Rather, the coupling element can be provided as a transmission member separate therefrom, in order to bring about a driving connection between the hand lever leg and the cutting part, in particular a direct driving connection between the hand lever leg and the cutting part. For example, this makes it easier to add the coupling mechanism to an existing cutting device with a ratchet mechanism, since the ratchet mechanism can remain unchanged and only the coupling element, for example, needs to be added for the transmission of force.

With an additional embodiment, the cutting device is designed so that, during the transmission of force via the coupling element, the drive pawl is in an effective position with respect to the toothing and is in freewheeling operation. The term "freewheeling operation" refers in particular to the fact that the drive pawl is already in contact with the toothing, but there is no transmission of force via the drive pawl to the toothing; that is, the drive pawl runs freely with respect to the toothing. This measure facilitates a rapid changeover from the transmission of force via the coupling element to the transmission of force via the ratchet mechanism or via the drive pawl, as the case may be. For example, such rapid change can be achieved by interrupting or reducing the flow of force via the coupling element so that the drive pawl, which was previously freewheeling relative to the toothing, then engages in the toothing in a force-transmitting manner, without the need for a switching operation with regard to the drive pawl.

In one possible embodiment, the coupling element is articulated to the cutting part and to the hand lever leg via a respective articulation point, in order to bring about the transmission of force from the hand lever leg to the cutting part. For example, the coupling element is formed to be elongated. For example, the coupling element is a coupling rod. For example, the articulation points are arranged at a distance from one another, in particular arranged at a distance from one another in the longitudinal direction of the coupling element. For example, the articulation points are each provided in the region of a longitudinal end of the coupling element.

An interruption of the transmission of force via the coupling element or a reduction of the force transmitted via the coupling element below a minimum force necessary for cutting via the coupling mechanism can be realized by, for example, one of the articulation points being variable in position and being designed to execute a swerving motion in response to a motion exerted by the hand lever leg or the cutting part. In order to bring about the transmission of force from the hand lever leg to the cutting part, it is provided, for example, that the one articulation point is in a transmission position.

According to one embodiment, the one articulation point can be held in the transmission position by the force of at least one spring element, wherein the at least one spring element is designed such that, when a predetermined maximum transmission force is exceeded, the at least one spring element releases a spring travel to allow the compensating motion of the one articulation point. Such measure aims to have the cutting device automatically change from force transmission via the coupling element to force transmission via the ratchet mechanism, if the cutting force required to cut the material to be cut is greater than a cutting force that can be applied by force transmission via the coupling element. The operator of the cutting device does not need to make any change in the operation of the hand lever leg for this purpose. In this respect, such measure favors user-friendly cutting of the material to be cut, even if greater cutting forces become necessary.

The at least one spring element can be integrated in the hand lever leg. For example, the at least one spring element is supported on one end against the hand lever leg, in particular a wall of the hand lever leg, and on the other end against the one articulation point of the coupling element. For example, the at least one spring element is a tension spring or a compression spring. For example, a guide is also provided, in which the at least one spring element can unfold its change in length in a guided manner, in order to enable the swerving motion of the one articulation point. The guide can be integrated into the hand lever leg. For example, the guide is formed by wall surfaces of the hand lever leg.

The cutting device can include a forced guide, such as a linear guide, to allow guided motion of the one articulation point and/or to bring the one articulation point into the transmission position in a guided manner. For example, a shifting link with a slotted link element and a guide element guided on it is provided, on which the one articulation point is formed. For example, the slotted link element has a stop for the guide element, in order to hold the one articulation point in the transmission position. For example, the slotted link element also comprises a guide section for a guided motion of the guide element, in order to allow the swerving motion of the one articulation point.

By means of such a forced guide, the variability of the one articulation point described above can be realized in a technically simple manner and/or in a structurally compact manner. For example, the shifting link enables such a compact design that the shifting link can be integrated into the hand lever leg; in particular, it can be at least partially or completely accommodated therein. For example, the slotted link element is formed on the hand lever leg. Alternatively, the slotted link element can be a separate component.

Furthermore, the slotted link element can have an additional guide section, which can be used as a feed section in order to move the guide element against the stop. In this respect, the slide block offers the possibility of controlling the motion of the guide element in such a manner that the one articulation point reliably reaches the transmission position when switching to force transmission via the coupling element. For example, the slotted link element is formed to be annular and the stop and/or the guide section and/or the additional guide section is formed, in particular at least partially formed, on the inner circumference.

According to one embodiment, the ratchet mechanism includes a retaining pawl that can be engaged against the toothing, in order to block the motion of the cutting part toward the open position. Such measure is aimed at preventing unintentional opening of the cutting part relative to the supporting part if, in the course of a ratcheting operation, that is, a back-and-forth motion of the hand lever leg, a return motion of the hand lever leg takes place without a cutting motion of the cutting part. The retaining pawl makes it possible for the cutting part to remain in the position it has reached if the hand lever leg is moved back to its initial position for a further cutting operation in the course of a new ratcheting operation.

A resetting element can be provided, which is designed to bring the retaining pawl into an unlocked position with respect to the toothing, preferably against the force of a spring element, such that the cutting part automatically executes an opening motion into the open position by the force of an additional spring element. Such measure is aimed at making the opening of the cutting part, that is, the execution of the opening motion of the cutting part into the open position, easier to handle. In the open position of the cutting part, the material to be cut can then be placed on the supporting part or accommodated between the cutting part and the supporting part, as the case may be.

With one embodiment, the resetting element is designed to be used as a guide for the coupling element. For example, the resetting element is used as a guide, in order to guide an accompanying motion of the coupling element during the opening motion of the cutting part in such a manner that the one articulation point is brought into the transmission position. This gives the resetting element a multiple function, which in turn favors a compact design and/or a reduction of the cutting device to as few components as possible and, in particular, supports a reliable motion of the coupling element into the position for force transmission. One possible design is that the resetting element has a projection, in particular a cam, and is designed such that the projection holds the retaining pawl in the unlocked position, and for example it is further provided that a surface section of the projection forms the guide for the coupling element.

For example, the resetting element is designed as a resetting lever, which is mounted for pivoting on the supporting part and/or on a handle leg fastened to the supporting part. For example, the resetting element can be pivoted against the force of a spring element from an initial position, such as a rest position, to a functional position, in which the resetting element holds the retaining pawl in the unlocked position and/or serves as a guide for the coupling element.

In order to change from force transmission via the coupling element to force transmission via the drive pawl, according to one embodiment, the cutting device is designed to bring the one articulation point out of the transmission position by moving the hand lever leg from an intermediate position between an initial position and an extended position in the direction of the extended position or into the extended position and thereby, for example, the drive pawl and the retaining pawl are present in an effective position with respect to the toothing. Such measure makes it possible to change from a direct drive brought about by the coupling mechanism to a ratchet drive brought about by the ratchet mechanism, for which purpose an operating motion of the hand lever leg is used.

In this manner, easy operation of the cutting device is supported, in order to bring the cutting part rapidly into a cutting position against the material to be cut and/or to apply a relatively large cutting force to cut the material to be cut. A rapid feed of the cutting part from the open position to the cutting position with respect to the material to be cut can be achieved, for example, by the direct drive. If, for example, the required cutting force is greater than can be applied by the direct drive, the specified operating motion of the hand lever leg can be used to switch from the direct drive to the ratchet drive, which then enables cutting with greater cutting force.

With one possible design, the pivot axis of the hand lever leg is arranged in the region of an end, in particular a longitudinal end, which is turned toward the cutting part. This favors a compact design of the coupling mechanism and/or the ratchet mechanism, since the pivot axis is relatively close to the cutting part. For example, the drive pawl of the ratchet mechanism is allocated to the hand lever leg, in particular pivotably mounted on it. For example, the toothing is assigned to the cutting part; in particular, it is connected to the cutting part in a rotationally fixed manner, for example it is integrally formed on the cutting part.

With one possible design, the cutting device comprises two handle legs that can be pivoted with respect to one another, wherein one of the handle legs is formed by the hand lever leg and the other handle leg is firmly connected to the supporting part as a fixed leg or is integrally formed on it, such that the handle legs execute a pivoting motion about the pivot axis of the hand lever leg. The fixed leg and/or the supporting part can also be firmly connected to a base body or integrally formed on it. For example, the retaining pawl of the ratchet mechanism is allocated to the fixed leg and/or the base body, in particular pivotably mounted on it. For example, the resetting lever is assigned to the fixed leg and/or the base body, in particular pivotably mounted on it.

According to an additional embodiment, the cutting device is formed for the chipless cutting of the material to be cut by knife action and the cutter is a knife blade. For example, the cutter has a cutting tip, which is formed by two inclined planes converging at an acute angle. The cutting tip can be formed by two inclined planes converging at an angle of less than 5 degrees. It can further be provided that the cutter has a cutting edge or cutting tip, as the case may be, that extends in a straight line or extends essentially in a straight line.

For example, the cutter has a cutting edge, which extends in a straight line over at least a length section. For example, the cutting edge has two length sections, in particular adjacent length sections, which are at an angle to each other. It has been shown that, after one of the length sections has entered the material to be cut, the following cutting operation is facilitated if the at least two length sections of the cutting edge that are at an angle to each other are provided.

In principle, the cutting edge can also have at least one length section over which the cutting edge extends in a curved manner.

A method for the chipless cutting of material to be cut by means of the cutting device described above comprises, for example, the step of manually operating the resetting element. In particular, the method comprises the step of manually operating the resetting element, as a result of which the retaining pawl is brought into the unlocked position.

In particular, the method comprises the step of manually operating the resetting element, by which the retaining pawl is brought into the unlocked position and, in turn, as a result of this, by means of spring force, the cutting part executes an opening motion into the open position and the coupling element executes a motion accompanying the opening motion automatically.

In particular, the motion of the coupling element brings the one articulation point into the transmission position, and thus the cutting device is in a direct cutting mode. In particular, in the direct cutting mode, the transmission of force from the hand lever leg to the cutting part takes place via the coupling element. In this manner, the cutting device can be brought into an initial state, in which the cutting device is in the direct cutting mode and the cutting part is in the open position, wherein such initial state is brought about solely by operating the resetting lever.

An additional method for the chipless cutting of material to be cut by means of the cutting device described above is based, for example, on the direct cutting mode described above, in which, for example, a transmission of force from the hand lever leg to the cutting part takes place via the coupling element and, for example, the drive pawl and the retaining pawl of the ratchet mechanism are in an effective position with respect to the toothing. In particular, the additional method further assumes that the cutting part is already moved toward the closed position, by which the hand lever leg is in an intermediate position between the initial position and the extended position.

The additional method comprises, for example, the step of pivoting the hand lever leg from the intermediate position toward the extended position or to the extended position. In particular, the additional method comprises the step of pivoting the hand lever leg from the intermediate position toward the extended position or in the extended position, by which the one articulation point is moved out of the transmission position, and the cutting device is thereby in a ratchet cutting mode. In particular, in the ratchet cutting mode, the transmission of force from the hand lever leg to the cutting part takes place via the drive pawl and the toothing. This suggests a user-friendly procedure for switching from the direct cutting mode to the ratchet cutting mode if, for example, a greater cutting force is required to cut the material to be cut than can be applied in the direct cutting mode.

According to one aspect, the invention also comprises a use of the cutting device described above for cutting to length a plastic or plastic composite pipe or other deformable workpiece. The plastic pipe and/or the plastic composite pipe are intended, for example, for use in the heating and/or sanitary sector, for example, for use in a drinking water line. The plastic pipe can be made of PE, PP and/or PVC or have such a material. The plastic composite pipe can be a so-called "multilayer pipe." For example, an aluminum layer is provided in the plastic composite pipe, in particular embedded in the pipe wall.

Further details and features of the invention are apparent from the following description of an exemplary embodiment based on the drawing.

DETAILED DESCRIPTION

Figure 1:
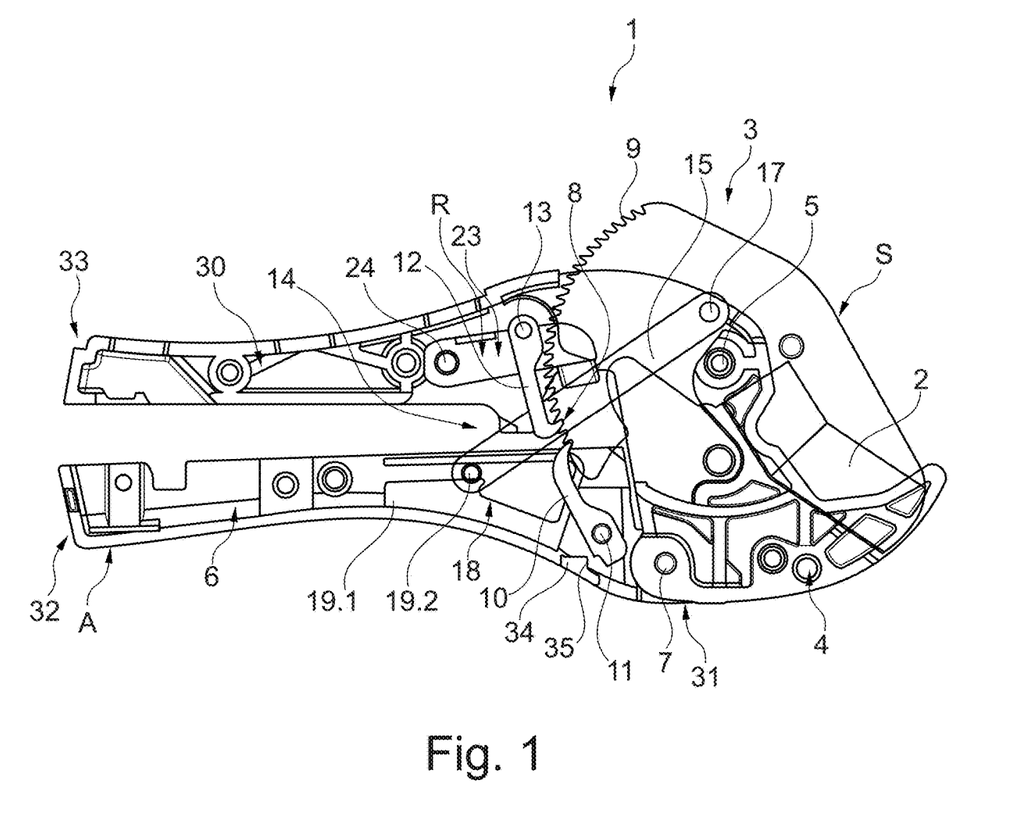
FIG. 1 shows a possible embodiment of a manually operated cutting device for the chipless cutting of material to be cut in an initial state, shown in a sectional view.

FIG. 1 shows a possible embodiment of a manually operated or manually operable, as the case may be, cutting device 1 for cutting material to be cut in a sectional view. The cutting device 1 can be used for severing, in particular cutting to length, plastic pipes or plastic composite pipes. Such pipes are used, for example, in the heating and/or sanitary sector, for example as components of a drinking water line or heating line. In principle, the cutting device 1 can also be used for cutting branches or other biogenic material to be cut.

The cutting device 1 comprises, for example, a cutting part 3 with a cutter 2 and, in particular, a supporting part 4 serving as a support for the material to be cut, which, for example, assumes the function of a counterholder. Preferably, the supporting part 4 is designed as an anvil or has an anvil. Alternatively, the supporting part 4 itself can also be formed as a cutter or have a cutter. Preferably, the cutter 2 is a knife blade in order to cut the material to be cut by knife action.

Preferably, the cutting part 3 and the supporting part 4 are mounted for rotation with respect to one another, in particular mounted for rotation with respect to one another, about a common axis of rotation 5. Preferably, the cutting part 3 is rotatable relative to the supporting part 4 between an open position O (FIG. 4) and a closed position S about the axis of rotation 5. In FIG. 1, the cutting part 3 is in the closed position S. Furthermore, the sectional view of FIG. 1 is a longitudinal section of the cutting device 1 transverse to the axis of rotation 5.

Furthermore, the cutting device 1 comprises, for example, a hand lever leg 6 and a ratchet mechanism 8. Preferably, the hand lever leg 6 is articulated to the supporting part 4 for pivoting about a pivot axis 7. Preferably, the pivot axis 7 is allocated to a region of an end 31 of the hand lever leg 6, in particular a longitudinal end of the hand lever leg 6. Preferably, this end 31 is turned toward the cutting part 3.

Preferably, the ratchet mechanism 8 is designed to convert a back-and-forth motion of the hand lever leg 6 about the pivot axis 7 into a continuous rotational motion of the cutting part 3 toward the closed position S. For this purpose, the ratchet mechanism 8 preferably has toothing 9 and a drive pawl 10, which can be brought or is brought into an effective position with it, in order to bring about a transmission of force from the hand lever leg 6 to the cutting part 3 via it. Preferably, the ratchet mechanism 8 also comprises a retaining pawl 12, which can be brought or is brought into an effective position with the toothing 9, in order to retain the cutting part 3 against an opening motion toward the open position O.

Preferably, the toothing 9 is assigned to the cutting part 3. Preferably, the drive pawl 10 is assigned to the hand lever leg 6. Preferably, the retaining pawl 12 is assigned to the supporting part 4. For example, the toothing 9 is connected to the cutting part 3 in a rotationally fixed manner and/or is integrally formed on the cutting part 3. For example, the drive pawl 10 is mounted on the hand lever leg 6 for rotation about an axis of rotation 11. For example, the retaining pawl 12 is mounted on the supporting part 4 for rotation about an axis of rotation 13.

Preferably, a resetting element 23 is provided, which is designed to move the retaining pawl 12 out of an effective position of the toothing 9, such that the retaining pawl 12 then no longer has a locking effect with respect to the cutting part 3. For example, the resetting element 23 is formed as a resetting lever. Preferably, the resetting element 23 is mounted on the supporting part 4 for rotation about an axis of rotation 24. In FIG. 1, the resetting element 23 is in a rest position R. Preferably, the resetting element 23 does not perform any function in the rest position R.

The hand lever leg 6 and the handle leg 30 can be pivoted against each other. For example, the cutting device 1 is formed in the manner of scissors or pliers. For example, the handle leg 30 is firmly connected to or integrally formed on the supporting part 4 as a fixed leg. The handle leg 30 and the hand lever leg 6 can execute a pivoting motion relative to each other about the pivot axis 7. In such a case, the retaining pawl 12 can also be allocated to the handle leg 30, which is formed as a fixed leg, and in particular is mounted on it for rotation about the axis of rotation 13. Preferably, the handle leg 30 and the hand lever leg 6 each have an end 32, 33, which in each case is turned away from the cutting part 3 and forms a free end, for example.

The cutting device 1 can also comprise a coupling mechanism 14, which is designed to convert a one-time pivoting motion of the hand lever leg 6 about the pivot axis 7 into a rotational motion of the cutting part 3 from the open position O to the closed position S. Thus, by means of the coupling mechanism 14, unlike in the case of the ratchet mechanism 8, there is no division of the cutting motion of the cutting part 3 into several operating motions of the hand lever leg 6; rather, by means of a one-time operating motion of the hand lever leg 6, a one-time cutting motion of the cutting part 3 is executed.

For this purpose, the coupling mechanism 14 preferably has a coupling element 15, such as a coupling rod, in order to bring about a transmission of force from the hand lever leg 6 to the cutting part 3 via it. Preferably, when force is transmitted via the coupling element 15, the drive pawl 10 is outside the flow of force, so there is no transmission of force via the drive pawl 10. Preferably, a direct drive connection between the hand lever leg 6 and the cutting part 3 is brought about via the coupling element 15.

Preferably, the coupling element 15 is articulated to the cutting part 3 on the one hand and to the hand lever leg 6 on the other hand via two articulation points 16, 17 spaced apart from each other, in order to bring about the transmission of force from the hand lever leg 6 to the cutting part 3. Preferably, the articulation point 17 allocated to the cutting part 3 is arranged at a distance from the axis of rotation 5, about which the cutting part 3 can be rotated relative to the supporting part 4. For example, the one articulation point 17 is above the axis of rotation 5 if the cutting part 3 is in the closed position S. For example, the one articulation point 17 is formed by a connecting pin, by which the coupling element 15 is connected for rotation to the cutting part 3.

Preferably, the articulation point 16 allocated to the hand lever leg 6 is variable in position, in that the articulation point 16 is designed, for example, to execute a swerving motion in response to a motion exerted by the hand lever leg 6 and/or the cutting part 3. Preferably, the articulation point 16 is in a transmission position U (FIG. 4) if the transmission of force from the hand lever leg 6 to the cutting part 3 takes place or is to take place, as the case may be, so that the cutting part 3 executes a cutting motion toward the closed position S.

In order to enable the swerving motion of the one articulation point 16, the cutting device 1 is provided with a shifting link 18, for example. Preferably, the shifting link 18 comprises a slotted link element 19.1 and a guide element 19.2 guided on it, which forms or has, as the case may be, the one articulation point 16. Preferably, the shifting link 18 is allocated to the hand lever leg 6, in particular integrated into the hand lever leg 6. The slotted link element 19.1 can be a separate component or formed on the hand lever leg 6.

Figure 2:
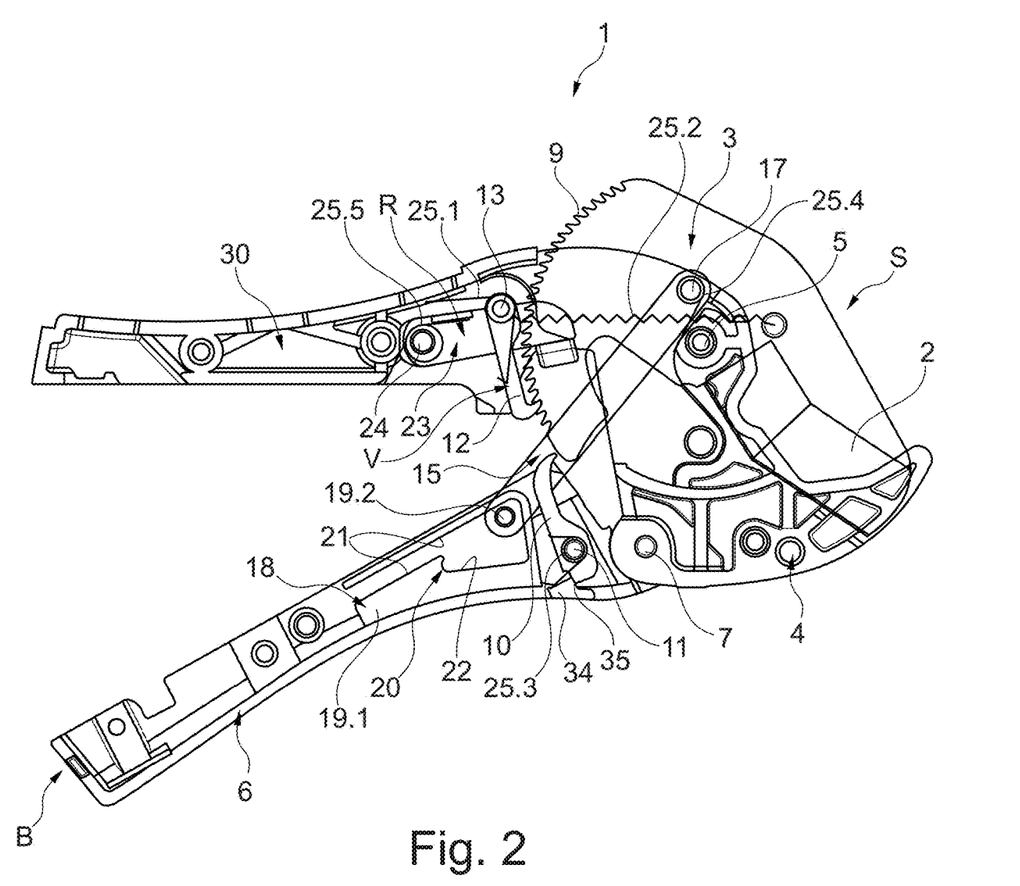
FIG. 2 to FIG. 5 show the cutting device of FIG. 1 in different positions to move from the initial state to a direct cutting mode.
Figure 4:
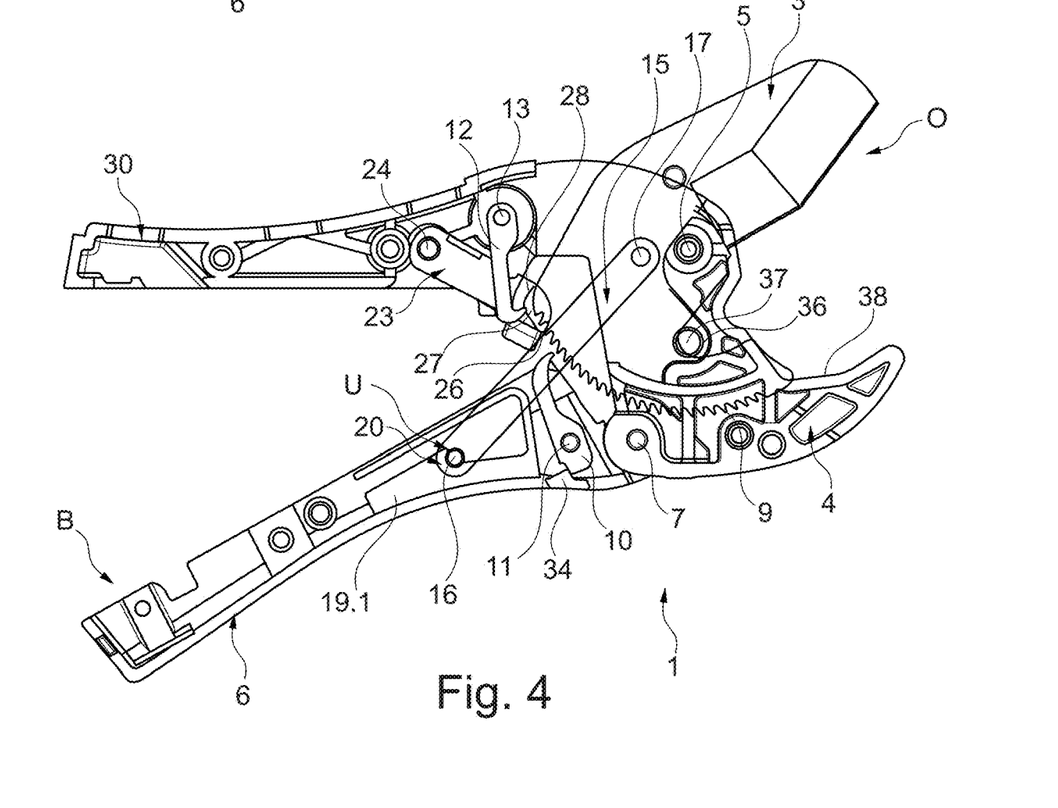

As shown in particular in FIG. 2, the slotted link element 19.1 comprises, for example, a stop 20 for the guide element 19.2, in order to hold the one articulation point 16 in the transmission position U (FIG. 4). Furthermore, the slotted link element 19.1 can have at least one guide section 21 for a guided motion of the guide element 19.2, in order to allow the swerving motion of the one articulation point 16. An additional guide section 22 can also be provided, which can be used as a feed section to bring the guide element 19.2 into position against the stop 20.

Preferably, the slotted link element 19.1 is formed to be annular and the stop 20 and/or the guide section 21 and/or the additional guide section 22 is formed on circumferential sections of the inner circumference of the slotted link element 19.1. Preferably, the annular slotted link element 19.1 is open at a circumferential point, such that the guide element 19.2 can be inserted into the interior of the annular slotted link element 19.1 above it.

FIG. 2 further shows that the cutting device 1 can comprise a plurality of spring elements 25.1, 25.2, 25.3, 25.4, 25.5, in order to automatically move certain components of the cutting device 1 by means of spring force. Preferably, one of the spring elements 25.1, 25.2, 25.3, 25.4, 25.5, in particular the one spring element 25.1, which is also referred to below as the first spring element, is allocated to the retaining pawl 12.

Preferably, another one of the spring elements 25.1, 25.2, 25.3, 25.4, 25.5, in particular the one additional spring element 25.2, which is also referred to below as the second spring element, is allocated to the cutting part 3. Preferably, a third spring element 25.3 is allocated to the drive pawl 10. Preferably, a fourth spring element 25.4 is allocated to the coupling element 15, in particular to the one articulation point 17. Preferably, a fifth spring element 25.5 is allocated to the resetting element 23.

The cutting device 1 enables the chipless cutting of material to be cut by manual force, whereby two different operating modes, namely a direct cutting mode on the one hand and a ratchet cutting mode on the other, can be used. The mode of operation of the cutting device 1 is described below by way of example:

Preferably, the cutting device 1 is in an initial state prior to a cutting operation, in which the cutting device 1 can be present, for example, for the purpose of storage and/or transport. In the initial state, which is shown for example in FIG. 1, the cutting part 3 is in the closed position S and the hand lever leg 6 is in an initial position A. Preferably, in the initial position A, the hand lever leg 6 is pivoted close to the handle leg 30. Preferably, in the initial position A, the hand lever leg 6 is fixed in its position by a locking device (not shown in FIG. 1). Preferably, in the initial position A, the force of a spring element (not shown in the figures) acts as a resetting force or extension force, as the case may be, on the hand lever leg 6. For example, such spring element is formed as a leg spring, which is supported on the one hand against the hand lever leg 6 and on the other hand against the supporting part 4 and surrounds the pivot axis 7, for example.

Preferably, in the initial state, the resetting element 23 is in the rest position R, in which it does not exert any function on the retaining pawl 12. The retaining pawl 12 is thus in an effective position with respect to the toothing 9, in particular in engagement with respect to the toothing 9. In particular, the retaining pawl 12 is pressed with respect to the toothing 9 by the force of the first spring element 25.1. In the initial state, the drive pawl 10 can also be present in an effective position with respect to the toothing 9, for example engaging in the toothing 9. For example, the drive pawl 10 is pressed with respect to the toothing 9 by the force of the third spring element 25.3. In the initial state, for example, the guide element 19.2 is outside the stop 20.

By preferably manually unlocking the locking device of the hand lever leg 6, the hand lever leg 6 is automatically deflected by the force of the associated spring element (not shown in the figures) from the initial position A to the extended position B, wherein the cutting part 3 remains in the closed position S due to the locking effect of the retaining pawl 12. Preferably, the force of the fourth spring element 25.4 holds or largely holds, as the case may be, the coupling element 15 in its previous position, such that the guide element 19.2 remains out of contact against the stop 20, in particular in the region of an upper end of the slotted link element 19.1 turned toward the supporting part 4. The state of the cutting device 1 after unlocking the locking device is shown in FIG. 2. Preferably, in the extended position B, the hand lever leg 6 is in an extended position with respect to the one handle leg 30, in particular in a maximum extended position.

When the hand lever leg 6 is deflected from the initial position A to the extended position B, the drive pawl 10 is disengaged from the toothing 9. Preferably, the drive pawl 10 is in contact against a stop 35 of a stop part 34, which is, for example, firmly connected to the hand lever leg 6 or is integrally formed on it. Preferably, the stop 35 is dimensioned such that the motion of the drive pawl 10 is limited in such a manner that, in the extended position B of the hand lever leg 6, the stop 35 keeps the drive pawl 10 at a distance from the toothing 9. Preferably, the drive pawl 10 is pressed against the stop 35 or the toothing 9 by the force of the third spring element 25.3.

Figure 3:
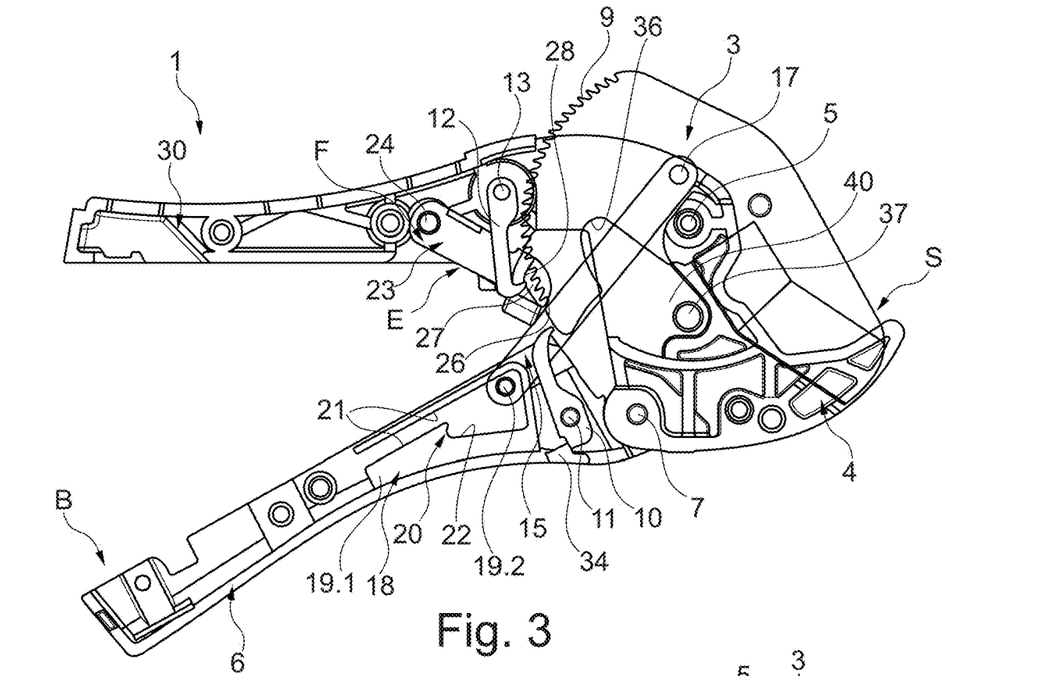

In order to then bring the cutting part 3 out of the closed position S, the resetting element 23 is brought from its rest position R into a functional position F, in particular pivoted about the axis of rotation 24. This state is shown in FIG. 3. The resetting element 23 is located there in the functional position F, in which the resetting element 23 has brought the retaining pawl 12 out of its locked position V (FIG. 2) with respect to the toothing 9 and is then located in an unlocked position E.

Preferably, this is brought about by a projection 27 on the resetting element 23, which has a surface section 28 of, for example, a circumferential surface that forms a driver, in order to entrain and move the retaining pawl 12 from the locked position V to the unlocked position E and, in particular, to hold it. Preferably, the projection 27 has an additional function; for example, the projection 27 serves as a guide 26 for the coupling element 15 in the course of its motion from the position in accordance with FIG. 3 to a position against the stop 20, which can be seen in FIG. 4.

As can be seen, for example, in FIG. 3, a base body 40 can be provided between the one handle leg 30 and the supporting part 4. The base body 40 can be firmly connected to the one handle leg 30 and/or firmly connected to the supporting part 4. In particular, the one handle leg 30 is integrally formed on the base body 40 and/or the supporting part 4 is integrally formed on the base body 40.

By unlocking the retaining pawl 12 and by disengaging the drive pawl 10 from the toothing 9 due to the pivoting motion of the hand lever leg 6 into the open position B, the cutting part 3 is free to move and is automatically moved from the closed position S to the open position O by the force of the second spring element 25.2. Preferably, the open position O is the largest possible extended position of the cutting part 3 away from a support section 38 of the supporting part 4, which is opposite the cutter 2 of the cutting part 3. Preferably, in the open position O, the cutting part 3 is brought into contact via a stop 36 against a counter stop 37 arranged on the supporting part 3.

The state of the cutting device 1 that is then reached is shown in FIG. 4. In the course of the opening motion of the cutting part 3 into the open position O, the coupling element 15 has also executed a motion, which was forcibly guided by the guide 26 of the resetting element 23 in such a manner that the guide element 19.2 comes into contact against the stop 20 and thus the one articulation point 16 is in a transmission position U. In the transmission position U, force can then be transmitted from the hand lever leg 6 to the cutting part 3 via the coupling element 15.

By transferring the one articulation point 16 to the transmission position U, the cutting device 1 is in the direct cutting mode. In order to carry out a cut of the material to be cut in this mode, it is preferable to move the resetting element back to the rest position. Preferably, this can be achieved by releasing the resetting element 23, which was previously held, for example, by hand, and moving it automatically into the rest position R by the force of the fifth spring element 25.5. Preferably, the retaining pawl 12 is then moved back to the locked position V by the force of the first spring element 25.1.

In the course of the present direct cutting mode, a manual operation of the hand lever leg 6 from the open position B in the direction of the extended position A then causes a transmission of force from the hand lever leg 6 directly to the cutting part 3 via the coupling element 15, by which the cutting part 3 is moved from the open position O toward the closed position S.

Figure 6:
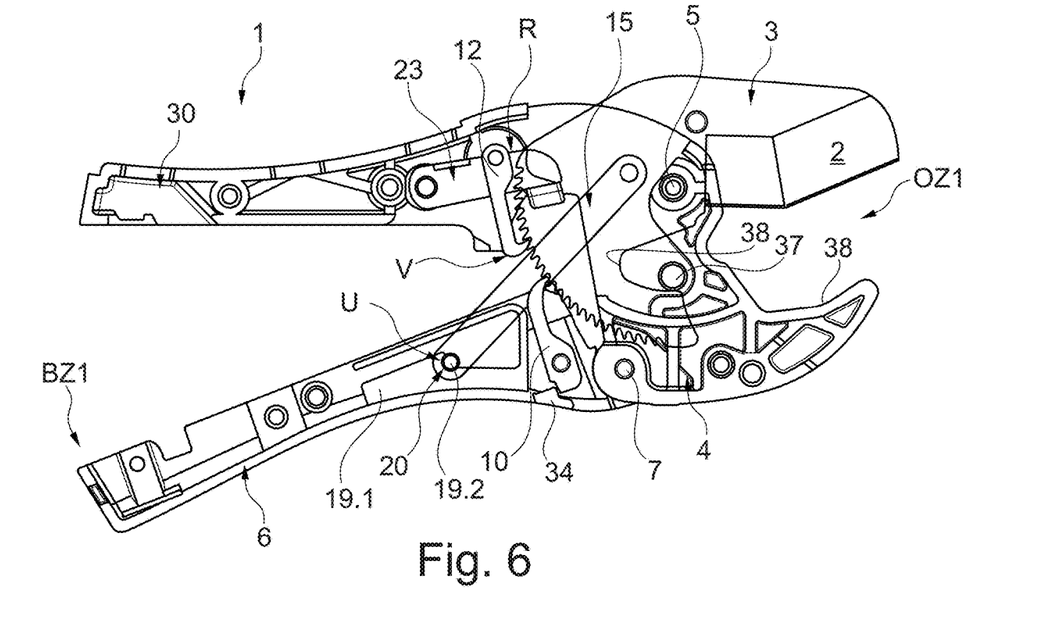
FIG. 6 and FIG. 7 show the cutting device of FIG. 1 in different positions during a direct cutting operation.
Figure 7:
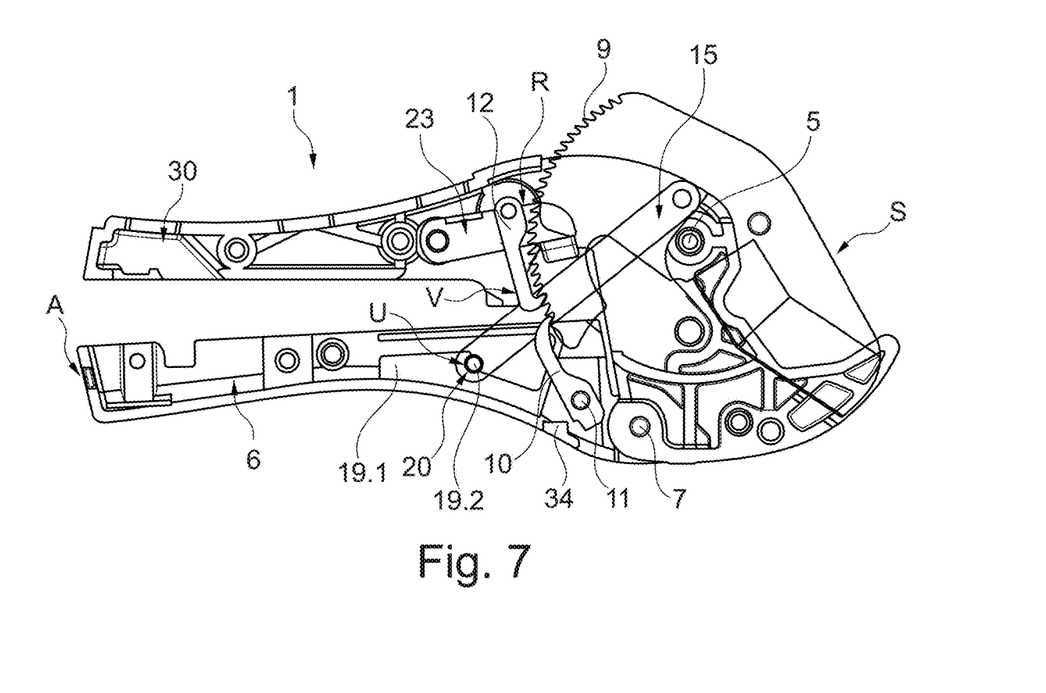

FIG. 6 shows an example of a state in which the hand lever leg 6 has been moved from the extended position B in the direction of the initial position A and is thus in a first intermediate position BZ1. In a corresponding manner, the cutting part 3 has been moved from the open position O in the direction of the closed position S and is then in a first intermediate position OZ1. FIG. 7 shows the state in which the direct cutting operation is completed and the hand lever leg 6 is once again in the initial position A and, accordingly, the cutting part 3 has been moved to the closed position S.

As shown in FIGS. 6 and 7, the retaining pawl 12 and the drive pawl 10 can each be in an effective position with respect to the toothing 9. Due to the transmission of force via the coupling element 15, the drive pawl 10 is in a freewheel position with respect to the toothing 9. Likewise, the retaining pawl 12 is in a freewheel position with respect to the toothing 9.

Figure 8:
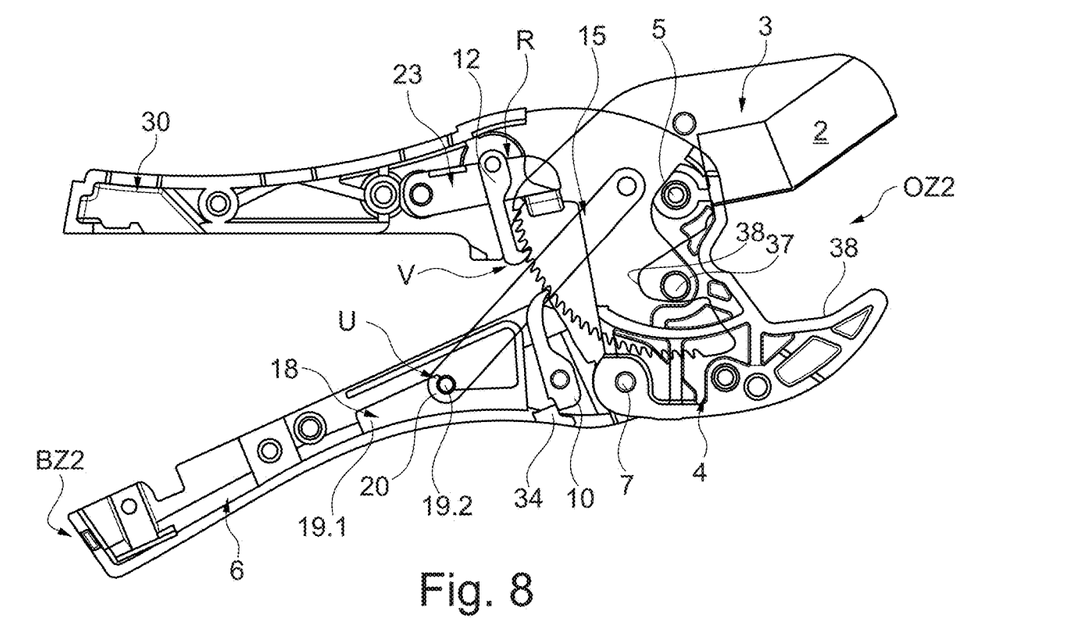
FIG. 8 and FIG. 9 show the cutting device of FIG. 1 in different positions to change from the direct cutting mode to a ratchet cutting mode.
Figure 9:
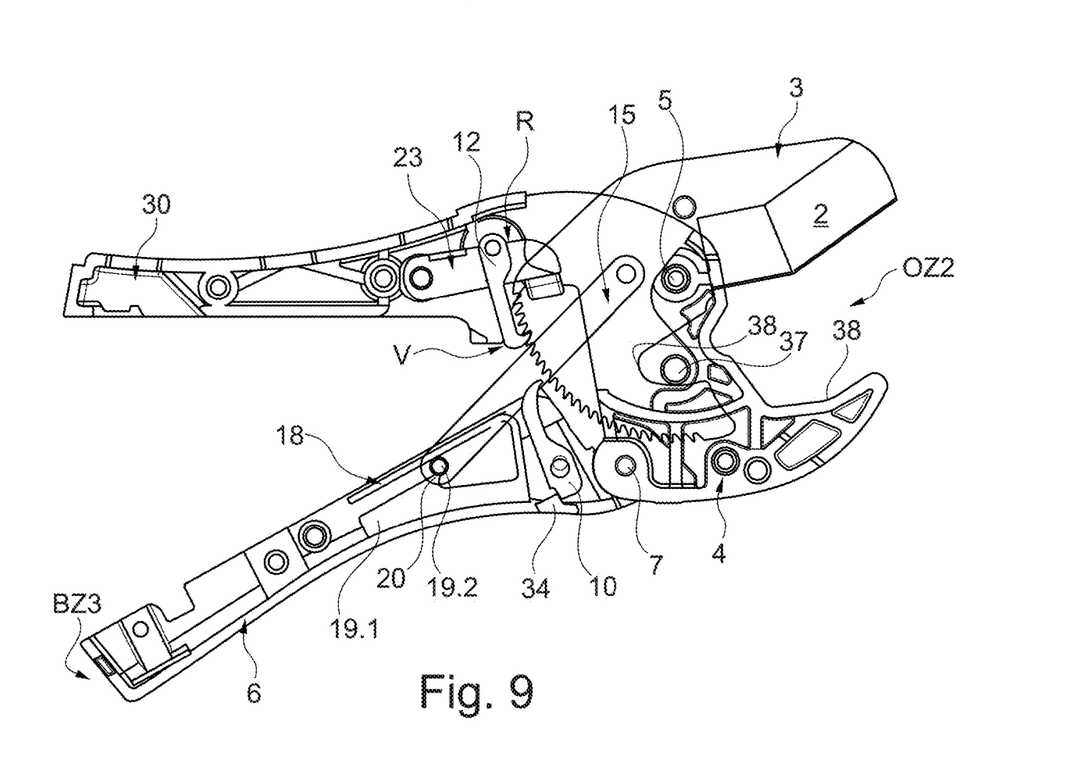

FIGS. 8 and 9 illustrate the mode of operation of the cutting device 1 when changing from direct cutting mode to ratchet cutting mode. In order to carry out such a change, the hand lever leg 6 is moved from the open position A in accordance with FIG. 5 in the direction of the one handle leg 30 and brought into a second intermediate position BZ2 and, by transmitting force via the coupling element 15, the cutting part 3 is pivoted from the open position O into a second intermediate position OZ2.

In order to then change from the present direct cutting mode to the ratchet cutting mode, the hand lever leg 6 is released somewhat, such that the hand lever leg 6 is automatically pivoted back toward the open position B, for example into a third intermediate position BZ3, by the force of the associated spring element (not shown in the figures). Since the retaining pawl 12 is in the locked position V with respect to the toothing 9, there is no opening motion of the cutting part 3 in the direction of the open position O. Rather, the cutting part 3 remains in the intermediate position OZ2, as shown in FIG. 8.

Due to the pivoting motion of the hand lever leg 6 in the direction of the stop position B and due to the cutting part 3 remaining motionless, the stop 20 of the slotted link element 19.1 is brought out of the stop position against the guide element 19.2, and thus the one deflection point 16 leaves the transmission position U. As a result, the transmission of force from the hand lever leg 6 to the cutting part 3 then no longer takes place via the coupling element 15; rather, the transmission of force takes place via the drive pawl 10 if the hand lever leg 6 is operated in the direction of the initial position A. Due to the configuration of the slotted link element 19.1, the guide element 19.2 can execute a swerving motion in the slotted link element 19.1, such that, in the ratchet cutting mode, it is ensured that there is no transmission of force via the coupling element 15.

Figure 5:
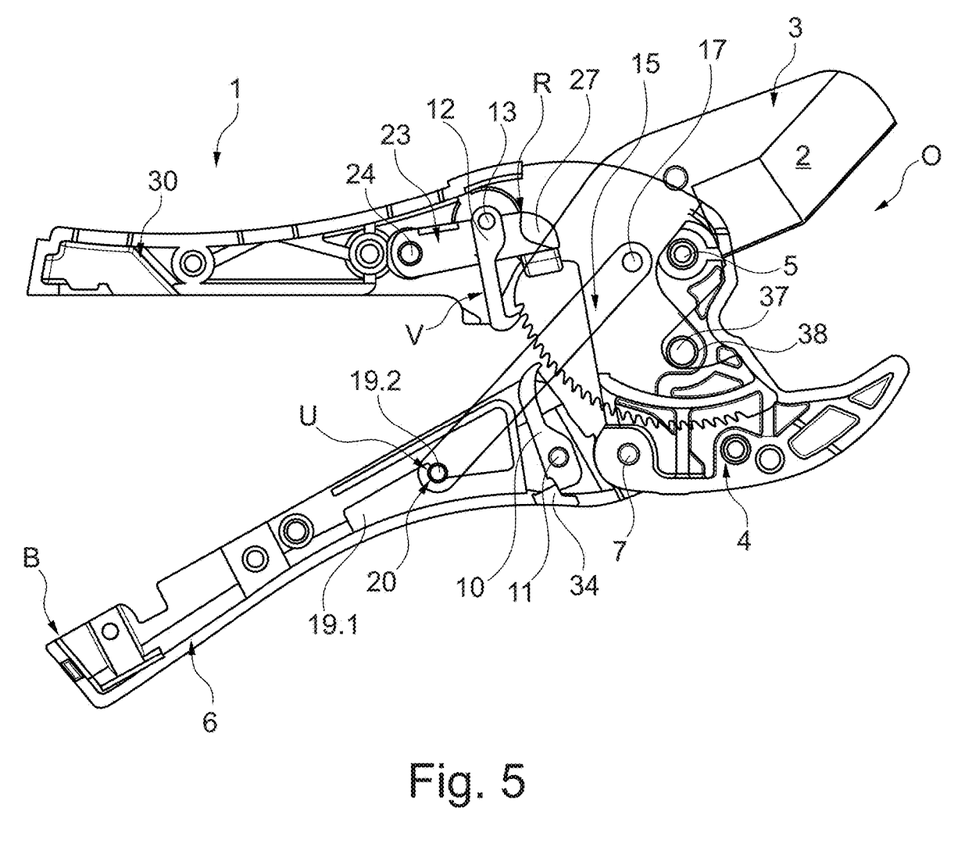

The mode of operation described by way of example makes it possible for the cutting device 1 to be in the direct cutting mode first if the cutting device 1 is opened, that is, the locking of the hand lever leg 6 is released and the hand lever leg 6 then pivots automatically into the open position B (FIG. 5). The direct cutting mode enables a rapid feed of the cutting part 3 against a cutting material placed between the cutting part 3 and the support section 38 of the supporting part 4, in that the cutting part 3 can be brought one time from the open position O into the contact position against the cutting material by a one-time pivoting motion or operation, as the case may be, of the hand lever leg 6 about the pivot axis 7.

Depending on the required cutting force, it is then possible either to remain in the direct cutting mode or to switch to the ratchet cutting mode as described above. In this respect, the cutting device 1 has the advantages of cutting material to be cut over a wide range of a cutting force that can be applied. At the same time, the cutting operation can be carried out rapidly, even for relatively compact material to be cut, since the direct cutting mode enables a rapid feed of the cutting part 3 from the open position O to rest against the material to be cut.

For example, the cutting device 1 enables plastic pipes or plastic composite pipes with a diameter of up to approximately 35 mm, in particular up to 35, preferably up to 32 mm to be severed in direct cutting mode. The ratchet cutting mode allows plastic pipes or plastic composite pipes with a diameter of up to approximately 75 mm, in particular up to 75 mm, to be cut or cut to length, as the case may be.

In the present description, reference to a specific aspect or a specific embodiment or a specific configuration means that a specific feature or property that is described in connection with the respective aspect or the respective embodiment or the respective configuration is at least contained therein, but does not necessarily have to be included in all aspects or embodiments or configurations.

The use of any or all examples or exemplary language in the text is intended only to illuminate the invention and is not a limitation with respect to the scope of the invention, unless otherwise claimed.

LIST OF REFERENCE SIGNS

1 Cutting device
2 Cutter
3 Cutting part
4 Supporting part
5 Axis of rotation
6 Hand lever leg
7 Pivot axis
8 Ratchet mechanism
9 Toothing
10 Drive pawl
11 Axis of rotation
12 Retaining pawl
13 Axis of rotation
14 Coupling mechanism
15 Coupling element
16 Articulation point
17 Articulation point
18 Shifting link
19.1 Sliding block
19.2 Guide element
20 Stop
21 Guide section
22 Additional guide section
23 Resetting element
24 Axis of rotation
25.1 Spring element (first spring element)
25.2 Additional spring element (second spring element)
25.3 Third spring element
25.4 Fourth spring element
25.5 Fifth spring element
26 Guide
27 Projection
28 Surface section
30 Handle leg
31 End
32 End
33 End
34 Stop part
35 Stop
36 Stop
37 Counter stop
38 Support section
40 Base body
S Closing position (cutting part 3)
O Open position (cutting part 3)
OZ1 Intermediate position (cutting part 3)
OZ2 Intermediate position (cutting part 3)
A Initial position (hand lever leg 6)
B Extended position (hand lever leg 6)
BZ1 Intermediate position (hand lever leg 6)
BZ2 Intermediate position (hand lever leg 6)
BZ3 Intermediate position (hand lever leg 6)
E Unlocked position (retaining pawl 12)
V Locked position (retaining pawl 12)
U Transmission position (articulation point 16)
R Rest position (resetting element 23)
F Function position (resetting element 23)

The invention claimed is:

1. A cutting device (1) for chipless cutting of a material, comprising:
a cutting part (3) having a cutter (2), and
a supporting part (4), configured to support the material to be cut,
wherein the cutting part (3) and the supporting part (4) are rotatably mounted to one another defining an axis of rotation (5) and are designed to be rotated with respect to one another about the axis of rotation (5) between an open position (O) and a closed position (S);
a hand lever leg (6) being pivotally connected to the supporting part (4) for pivoting about a pivot axis (7), the cutting part (3) being connected to a toothing (9) and the hand lever leg (6) being connected to a drive pawl (10), the toothing (9) and the drive pawl (10) being configured to operationally engage with each other to thereby transfer pivotal actuation of the hand lever leg (6) relative to the supporting part (4) into a rotational motion of the cutting part (3) relative to the supporting part (4); and
a coupling element (15) operationally connecting the cutting part (3) with the hand lever leg (6),
the coupling element (15) having a first end pivotally connected to the cutting part (3) at a first articulation point (17),
the coupling element (15) having a second end with a guide element (19.2) received within a slotted link element (19.1) in the hand lever leg (6),
the coupling element (15) being configured to,
transfer a pivotal actuation of the hand lever leg (6) relative to the supporting part (4) into a rotational motion of the cutting part (3) relative to the supporting part (4) when the guide element (19.2) engages a stop (20) of the slotted link element (19.1),
not to transfer any forces between the hand lever leg (6) and the cutting part (3) when the guide element (19.2) is outside the stop (20) of the slotted link element (19.1).

2. The cutting device according to claim 1,
wherein the first articulation point (17) is located in fix position relative to the cutting part (3), and
wherein configuration, being the guide element (19.2) is held in a fixed position relative to the hand lever leg (6) when engaging the stop (20) and
wherein the guide element (19.2) is able to freely travel along an extension of the hand lever leg (6) when outside the stop (20).

3. The cutting device according to claim 2,
wherein the stop (20) defines a fixed abutment position (U) for the guide element (19.2) of the coupling element (15),
wherein the slotted link element (19.2) further has a guide section (21) for restricting travel of the guide element (19.2) along an extension of the hand lever leg (6) when the coupling element (15) is outside the stop (20).

* * * * *

UNITED STATES PATENT AND TRADEMARK OFFICE
CERTIFICATE OF CORRECTION

PATENT NO. : 12,275,160 B2
APPLICATION NO. : 17/609758
DATED : April 15, 2025
INVENTOR(S) : Dennis Hesse, Maximilian Gottschalk and Jonas Schilling Page 1 of 1

It is certified that error appears in the above-identified patent and that said Letters Patent is hereby corrected as shown below:

In the Claims

Column 14, Line 44, Claim 1 "(19.1)," should read --"(19.1), and--

Column 14, Line 52, Claim 2 "wherein configuration, being the guide element" should read --wherein the guide element--

Signed and Sealed this
Thirteenth Day of May, 2025

Coke Morgan Stewart
*Acting Director of the United States Patent and Trademark Office*